US008412145B2

(12) United States Patent
Meshenberg

(10) Patent No.: US 8,412,145 B2
(45) Date of Patent: Apr. 2, 2013

(54) MOBILE BATTERY MANAGEMENT SYSTEM

(75) Inventor: Ruslan Meshenberg, Santa Clara, CA (US)

(73) Assignee: TeleNav, Inc., Sunnyvale, CA (US)

( * ) Notice: Subject to any disclaimer, the term of this patent is extended or adjusted under 35 U.S.C. 154(b) by 1042 days.

(21) Appl. No.: 11/809,159

(22) Filed: May 31, 2007

(65) Prior Publication Data

US 2008/0299938 A1    Dec. 4, 2008

(51) Int. Cl.
*H04B 1/16* (2006.01)
(52) U.S. Cl. ........... 455/343.2; 455/456.1; 455/456.2; 455/456.3; 455/424; 455/434; 455/457; 455/427; 455/435.2; 455/453; 455/446; 701/200; 701/202; 701/207; 701/211; 701/208
(58) Field of Classification Search ........... 455/343.2, 455/572, 456, 456.1–456.6, 424, 434, 457, 455/427; 701/207, 200, 202, 211, 208–209, 701/117
See application file for complete search history.

(56) References Cited

U.S. PATENT DOCUMENTS

| | | | |
|---|---|---|---|
| 5,905,900 A | 5/1999 | Combs et al. | |
| 6,611,687 B1* | 8/2003 | Clark et al. | 455/456.5 |
| 6,661,372 B1 | 12/2003 | Girerd et al. | |
| 6,665,549 B1 | 12/2003 | Reed | |
| 6,668,179 B2* | 12/2003 | Jiang | 455/572 |
| 6,829,532 B2* | 12/2004 | Obradovich et al. | 701/207 |
| 7,043,700 B1 | 5/2006 | Bertram et al. | |
| 7,123,141 B2 | 10/2006 | Contestabile | |
| 7,154,398 B2 | 12/2006 | Chen et al. | |
| 2003/0073446 A1* | 4/2003 | Tsuchiya | 455/456 |
| 2004/0048620 A1* | 3/2004 | Nakahara et al. | 455/456.1 |
| 2004/0135696 A1* | 7/2004 | Hasegawa | 340/636.1 |
| 2005/0038596 A1* | 2/2005 | Yang et al. | 701/200 |
| 2007/0067097 A1* | 3/2007 | Haatainen | 701/208 |
| 2008/0016144 A1* | 1/2008 | Hyun et al. | 709/203 |

FOREIGN PATENT DOCUMENTS

| | | |
|---|---|---|
| EP | 1318687 A2 | 6/2003 |
| WO | 2007026046 A1 | 3/2007 |

* cited by examiner

*Primary Examiner* — Kiet Doan
*Assistant Examiner* — Michael T Vu

(57) ABSTRACT

A mobile battery management system comprising receiving a battery management parameter by a client from a server over a communication path, detecting a battery control mode with the battery management parameter in the client, and operating the client based on the battery control mode and the battery management parameter.

18 Claims, 3 Drawing Sheets

FIG. 3 is a flow chart of the mobile battery management system of FIG. 1; and FIG. 4 is an illustration of a navigated route by the client with the mobile battery management system.

MOBILE BATTERY MANAGEMENT SYSTEM

TECHNICAL FIELD

The present invention relates generally to location based services systems, and more particularly, to mobile client navigation system wherein a mobile client and a server communicate to carry out navigation tasks.

BACKGROUND ART

Modern consumer electronics, especially in client devices such as cellular phones, digital cameras, and music players, are packing more integrated circuits into an ever-shrinking physical space with expectations for decreasing cost. Numerous technologies have been developed to meet these requirements. Some of the research and development strategies focus on new technologies while others focus on improving the existing and mature technologies. Research and development in the existing technologies may take a myriad of different directions.

As consumers seek increasingly more features and functions to add to their client devices, the added functions and features result in an ever increasing power demand on the mobile client device. Various technological approaches can be used to address this increased power consumption. One approach is to implement more efficient batteries as they become available, particularly with ongoing research on extending the life of batteries. Another would be to provide larger batteries. However, due to the limited size and real estate of a mobile consumer device to house a battery, increasing the size of the battery may not be desirable, or the added associated cost. There is therefore a need to maximize the efficiency of the battery or power consumption to power the increasing number of client functions desired by the user.

Thus, a need remains for a mobile battery management system to efficiently control power consumption in a mobile client device to preserve power for optimal long-term operation. In view of the ever-increasing added features desired by consumers in their mobile client devices, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides mobile battery management system comprising receiving a battery management parameter by a client from a server over a communication path, detecting a battery control mode with the battery management parameter in the client, and operating the client based on the battery control mode and the battery management parameter.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
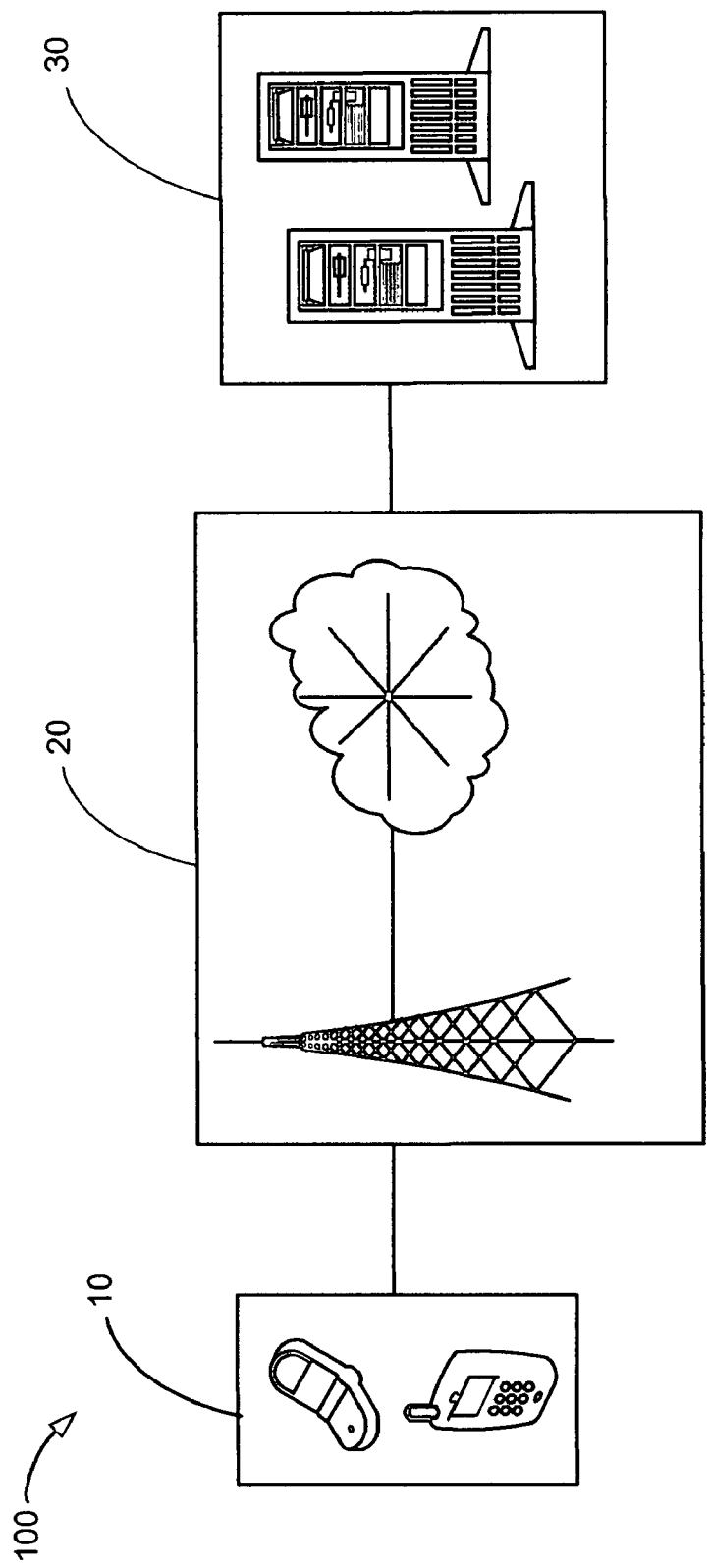
FIG. 1 illustrates a mobile battery management system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGS.

In addition, where multiple embodiments are disclosed and described having some features in common, for clarity and ease of illustration, description, and comprehension thereof, similar and like features one to another will ordinarily be described with like reference numerals. The embodiments have been numbered first embodiment, second embodiment, etc. as a matter of descriptive convenience and are not intended to have any other significance or provide limitations for the present invention. The term "system" as used herein means and refers to the method and to the apparatus of the present invention in accordance with the context in which the term is used.

Referring now to FIG. 1, therein is illustrated a mobile battery management system 100 in an embodiment of the present invention. A client 10 is connected to a communication path 20, such as a wireless telecommunication network, to a server. As used herein, client 10 can be of any of a variety of mobile devices, such as a cellular phone, a notebook computer, or other multi-functional mobile communication or entertainment devices having means to couple to a communication path to communicate with a server and also, preferably, global positioning system (GPS) function means for client location monitoring. Client 10 comprises, for example, a control device (not shown), such as a microprocessor, software (not shown), a memory, cellular components (not shown), navigation components (not shown), and a user interface. The user interface, such as a display, a key pad, and a microphone, and a speaker, allows the user to interact with the client 10. The microprocessor executes the software and provides the intelligence of the client 10 for interaction with the server 30 for the relevant information, the user interface, interaction to the cellular system of the communication path 20, and interaction to the navigation system of the communication path 20, as well as other functions pertinent to a location based service communication device.

The memory, such as volatile, nonvolatile memory, internal only, externally upgradeable, or a combination thereof, may store the software, setup data, and other data for the operation of the client 10 as a location based service communication device. The memory may also store the relevant information from the server 30 or preloaded, such as maps, route information, traffic information, and POI etc, and store the sampled or created relevant information to be transmitted to the server 30. For illustrative purpose, the functions of the client 10 may be performed by any one in the list of software, firmware, hardware, or any combination thereof The cellular components are active and passive components, such as microelectronics or an antenna, for interaction to the cellular system of the communication path 20. The navigation components are the active and passive components, such as microelectronics or an antenna, for interaction to the navigation system of the communication path 20.

As used herein, the communication path 20 can be of any of a variety of telecommunication networks. For example, the communication path 20 may include wireless communication, wired communication, or the combination thereof Satellite communication, cellular communication, wireless fidelity (WiFi), and worldwide interoperability for microwave access (WiMAX) are examples of wireless communication that may be included in the communication path 20. Ethernet, digital subscriber line (DSL), fiber to the home (FTTH), and plain old telephone service (POTS) are examples of wired communication that may be included in the communication path 20. Further, the communication path 20 may traverse a number of network topologies and distances. For example, the communication path 20 may include personal area network (PAN), local area network (LAN), metropolitan area network (MAN), and wide area network (WAN).

Figure 2:
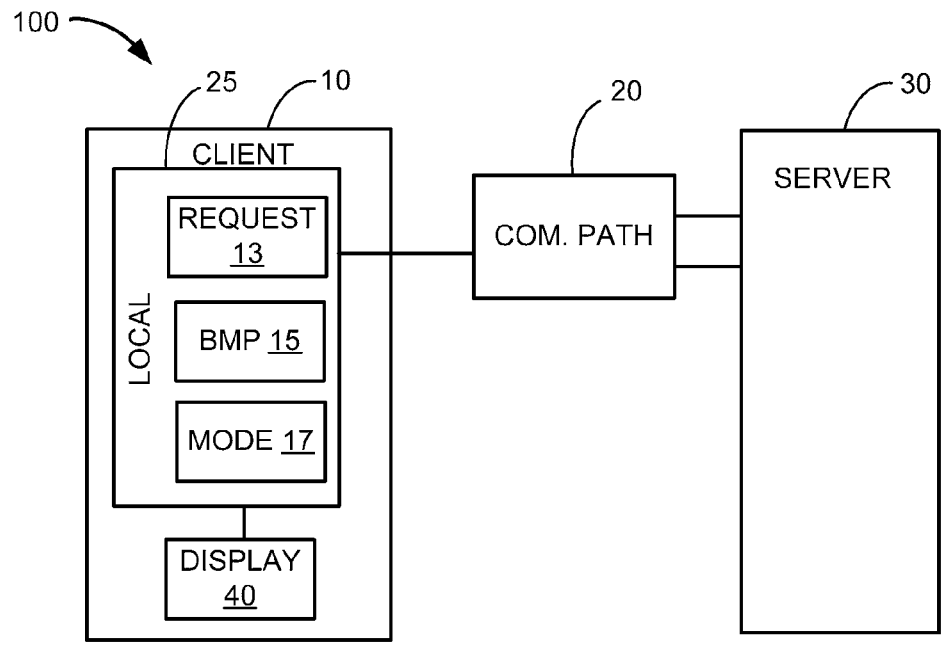
FIG. 2 is a block diagram of the mobile battery management system of FIG. 1.

Referring now to FIG. 2, therein is shown a block diagram of the mobile battery management system 100 of FIG. 1. The client 10 couples to the communication path 20 to send a server request 13 to the server 30. The client 10 receives in response thereto a battery management parameter 15 from the server 30 back over the communication path 20.

The battery management parameter 15 preferably comprises control parameters for controlling the operation of a display 40 of the client 10, preferably in association with displaying navigation route data received by the client 10. As further described later, the battery management parameter 15 may comprise control parameters for controlling the operation of the display 40 in association with a variety of navigation events, such as in association with notifying a user of navigational directions, of location-based information or messaging, such as relating to traffic data or landmark, as an example. Because the operation of display 40 is one of the major sources of battery consumption in the client 10, providing battery management parameter 15 from the server 30 for example, with navigation route data allows the client 10 and the server 30 to have battery management of the client 10 for increased operation time.

The client 10 may preferably store a battery control mode 17 in a local storage 25. The local storage 25 may be implemented in a number of ways. For example, the local storage 25 may be a nonvolatile storage such as non-volatile random access memory (NVRAM) or a volatile storage such as static random access memory (SRAM). The battery control mode 17 preferably includes locally stored control parameter for controlling the operation of the display 40 of the client 10, preferably in association with displaying navigation route data received by the client 10. The local storage 25 may also preferably store the battery management parameter 15.

As further described later, the battery control mode 17 may preferably comprise control parameters for controlling the operation of the display 40 in association with a variety of navigation events, such as in association with notifying a user of navigational directions, of location-based information or messaging, such as relating to traffic data or landmark, as an example. Additionally, it is understood that the battery control mode 17 may comprise user selected parameters or predetermined parameters that can be any of, or a combination of a variety client audiovisual control, or GPS operation control, including such as user requested notification or messaging by display or audio, of predetermined event such as location based information, navigation information, display brightness level, standby timing control, display re-activation control, a nighttime or ambient brightness control, or an audio control, or a GPS access control, and any other user selected parameters or predetermined parameters, such as to operate the display 40 at reduced brightness, turn off the display 40, or other like controls of the client 10 to preserve battery power.

Because the operation of display 40 is one of the major sources of battery consumption on client 10, providing battery management parameter 15 from the server 30 such as, for example, with navigation or traffic route data allows the client 10 and the server 30 to have battery management of the client 10 to preserve battery power of the client 10 for increased operation time.

The GPS operation of the client 10 or the audio output of the client 10 may also be preferably controlled by the battery management parameter 15 or the battery control mode 17, since both the GPS operation and the audio output can also be a substantial source of battery consumption.

Figure 3:
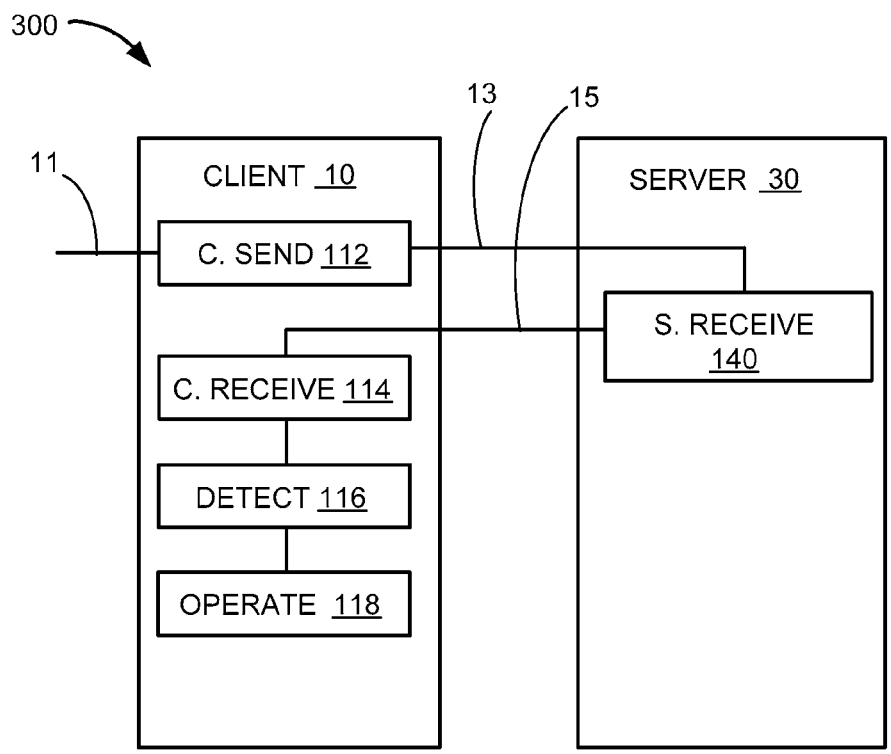

Referring now to FIG. 3, therein shown is a flow chart 300 of the mobile battery management system 100 of FIG. 1. In operation, for example, the client 10 preferably receives a destination request 11 from user input means (not shown) and sends the server request 13 via the communication path 20 of FIG. 1 to the server 30 in a block 112. The client 10 receives the battery management parameter 15 from the server 30 over the communication path 20 in a block 114. The client 10 preferably detects the battery control mode 17 for use of the battery management parameter 15 in a block 116, and operates the display 40 of FIG. 2 of the client 10 based on the battery control mode 17 and the battery management parameter 15 in a block 118.

In the flowchart 300 of the mobile battery management system 100, the server 30 preferably receives the server request 13 from the client 10 in a block 140, and sends the battery management parameter 15 to the client 10 over the communication path 20 of FIG. 1 in a block 140.

For illustrative purposes, the server 30 is described as providing the battery management parameter 15 to the client 10 as a response to the server request 13 resulting from the destination request 11, although it is understood that the server 30 may provide different responses. For example, the server 30 may provide navigation information, local service or business information, or local reminder information in addition to the battery management parameter 15. The server 30 may preferably calculate a value for the battery management parameter 15 in conjunction with the navigation information for conserving the battery usage in the client 10.

The battery management parameter 15 from the server 30 may comprise controls to the client 10 to synchronize "waking-up", or activating the display 40, to a display of navigation information for the presentation of various navigation delivery stages, such as to instruct user regarding upcoming navigation directions, preparing user to take action, and instructing user to take action associated with delivering navigation information. It is contemplated that battery management parameter 15 may also provide additional controls of the client 10 to further preserve battery power.

For example, battery management parameter 15 may also be specified to control not only the activation of the display 40 but also control the activation of audio in conjunction with, or without, activation of the display 40 in the delivery of the navigation information and user communication thereof In one option, controlling the length of time audio is active. Yet another control that can be specified by the battery management parameter 15 is to control the usage of GPS access to also minimize battery consumption. The use of the battery management parameter 15 or a portion thereof with the battery control mode 17 may be set, or may be overwritten, by the user of the client 10.

Figure 4:
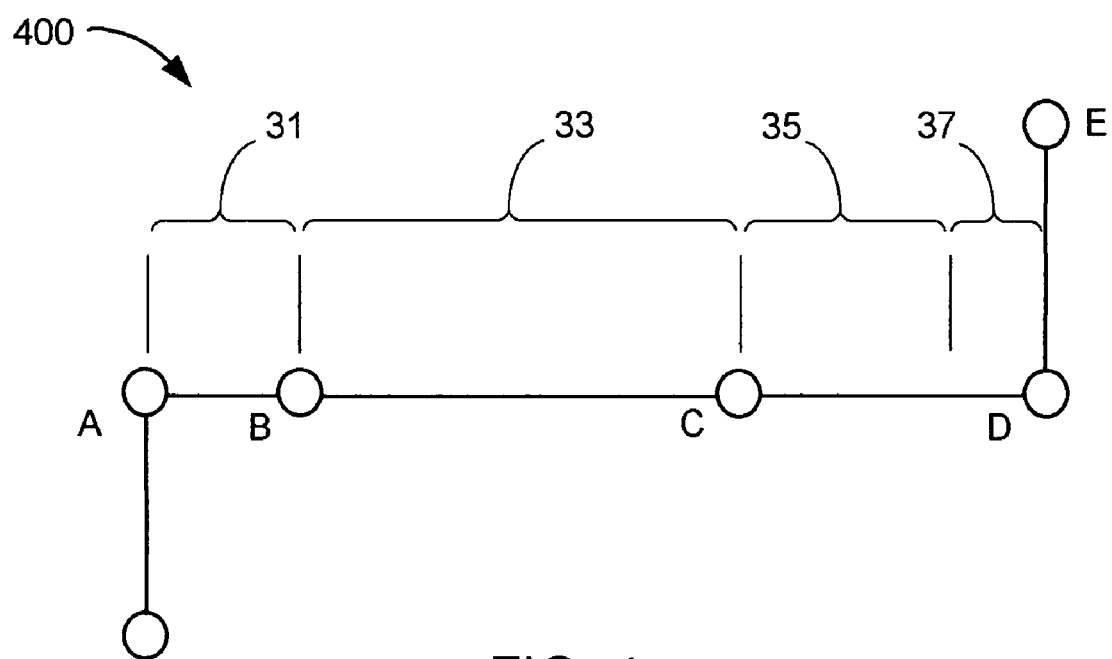

Referring now to FIG. 4, therein is illustrated a navigated route 400 by the client 10 with the mobile battery management system 100. The navigation route 400 may be preferably provided on the display 40 of FIG. 2 of the client 10 of FIG. 2. For example, to instruct a user (not shown) of the client 10 to navigate from "Start" to point A to point E, the display 40 may be preferably controlled by the battery management parameter 15 with the battery control mode 17 to display directions for the user in an initial stage 31.

The user may preferably provide the destination request 11 of FIG. 3 at the "Start". The server 30 may preferably provide the navigation route 400 as a response to the destination request 11. The battery management parameter 15 may be included in the information for the navigation route 400 or may be a separate response field or format.

From "Start" to point A, the battery control mode 17 in conjunction with the battery management parameter 15 preferably operates the client 10 with display 40, the GPS circuitry (not shown), and the audio circuitry (not shown) active. After the navigation event at the point A, the client 10 may preferably adjust power to the display 40, the GPS circuitry (not shown), and the audio circuitry (not shown) to a predetermined value provided by battery management parameter 15. The battery management parameter 15 may provide the predetermined value based on time or distance after the navigation event point A such that the client 10 may be in a power on period 31 from point A to a navigation event point B.

The client 10 may preferably enter a power saving stage 33 at the navigation event point B that is preferably based on the predetermined valued from the battery management parameter 15 and the battery control mode 17. For example, the server 30 of FIG. 2 preferably calculates the battery management parameter 15 for operating the client 10 in a lower power mode or standby mode in the power saving stage 33. The distance between point B and point C may be a long distance, time, or a combination thereof without other navigation events, such as changing traffic conditions or point of interest, such that the server 30 may provide the battery management parameter 15 for the client 10 to enter the lower power of power saving stage 33. The user may set the battery control mode 17 to override the battery management parameter 15. The server 30 may receive that battery status from the client 10 such that the battery management parameter 15 may override the battery control mode 17.

As the client 10 traverses the path from point B to point C, the client 10 may preferably have a portion of the circuitry powered and operating. For example, a timer circuit (not shown) in the client 10 may periodically activate necessary portions of the client 10 for receiving updates, such as current locations or current conditions. Other portions of the client 10 may remain active in the lower power mode, such as input keys or specialized input keys, such as hot keys, for the user to manually activate the client 10 from the lower power mode.

As the client 10 passes the navigation event point C, the battery management parameter 15 guides the client 10 to enter a preparation stage 35. The preparation stage 35 may have the battery management parameter 15 activate more portions of the client 10 or increase the frequency of obtaining updates. The battery management parameter 15 may provide a predetermined value, such as time, distance, or a combination thereof between point C and Point D for the client 10 to continue to operate in the preparation stage 35 or preparation mode. In the preparation stage 35, the battery management parameter 15 and the battery control mode 17 may preferably operate to re-activate the display 40 to "wake up" the display.

As the client 10 passes the predetermined value provided by the battery management parameter 15 after point C and before point D, the battery management parameter 15 guides the client 10 to enter an action stage 37. The battery management parameter 15 and the battery control mode 17 preferably operate to power the display 40 for displaying the navigational action to be taken at the navigation event Point D, such as to "Turn Left". Consequently, controlling the display activation and limiting the display operation to selected stages by the battery management parameter 15 or the battery control mode 17 provides battery management to the client 10 to extend overall operation of the client 10.

For illustrative purposes, the battery management parameter 15 is described retaining a static value from "Start" to the destination Point E, although it is understood that the battery management parameter 15 may not be static. For example, as traffic condition, such as accidents or weather condition changes, the server 30 may calculate and provide updates to the navigation route 400 and may also provide an update to the battery management parameter 15 based on calculations with the updated information.

Similarly for illustrative purposes, the battery control mode 17 is described retaining a static value from "Start" to Point E, although it is understood that the battery management parameter 15 may not be static. For example, as traffic conditions, such as accidents or weather condition changes, the server 30 may calculate and provide updates to the navigation route 400 and may also provide an update to the battery control mode 17 with the battery management parameter 15 based on calculations with the updated information.

As the client 10 operates, the client 10 may also provide updates to the server 30 based on the battery control mode 17, the battery management parameter 15, or a combination thereof. For example, the client 10 may have been manually re-activated from a lower power mode, this re-activation may be sent as an update to the server 30 to be used in further battery conservation calculation. As another example, the manual re-activation of the client 10 may occur in a region where updating the server 30 is not possible and the update may be stored in the client 10 for future update when the server 30 is accessible.

It has been discovered that the present invention increases the operational time of the client by controlling the power and operating portions of the client, such as the battery powered display operations by the server calculation of navigation information provided by the server. Moreover, one or more other features and functions of the client, such as controlling audiovisual operations such as a standby mode, a brightness level, and a control of the audiovisual mode or GPS operation, may be associated with the battery management parameter and the battery control mode to improve battery efficiency of the client.

Yet another important aspect of the present invention is that it advances and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method for operating a mobile battery management system having a client comprising:
   providing a battery management parameter from a server for receiving at the client based on a traffic condition;
   using a battery control mode with the battery management parameter; and operating a display of the client based on the battery control mode;
   wherein using the battery control mode includes using a predetermined mode for controlling an audio operation of the client.

2. The method as claimed in claim 1 wherein providing the battery management parameter includes receiving navigation data.

3. The method as claimed in claim 1 wherein providing the battery management parameter includes receiving traffic data.

4. The method as claimed in claim 1 wherein using the battery control mode includes using a user selected parameter.

5. The method as claimed in claim 1 wherein using the battery control mode includes using a predetermined mode for controlling a GPS operation of the client.

6. The method as claimed in claim 1 wherein using the battery control mode includes using a predetermined mode for controlling an operation of the display.

7. The method as claimed in claim 1 wherein using the battery control mode includes using a predetermined mode for controlling a standby timing control.

8. The method as claimed in claim 1 wherein operating the display includes activating the display to show navigation data.

9. The method as claimed in claim 1 wherein operating the display includes activating the display to show traffic data.

10. The method as claimed in claim 1 wherein operating the display includes activating the display to show a user requested event.

11. The method as claimed in claim 1 wherein operating the display includes activating the display to show a predetermined event.

12. A method for operating a mobile power management system having a client comprising:
    calculating a battery management parameter in a server based on a traffic condition;
    sending the battery management parameter from the server for receiving the battery management parameter at the client;
    using a battery control mode in the client with the battery management parameter; and
    operating a display of the client based on the battery control mode;
    wherein using the battery control mode includes using the battery management parameter for controlling an audio operation of the client.

13. The method as claimed in claim 12 wherein sending the battery management parameter includes sending navigation data.

14. The method as claimed in claim 12 wherein sending the battery management parameter includes sending traffic data.

15. The method as claimed in claim 12 wherein using the battery control mode includes using the battery management parameter for controlling a GPS operation of the client.

16. The method as claimed in claim 12 wherein using the battery control mode includes using the battery management parameter for controlling a standby operation of the client.

17. The method as claimed in claim 12 further comprising calculating navigation information.

18. The method as claimed in claim 12 wherein using the battery control mode includes using the battery management parameter for activating the client.

* * * * *